Figure 1:
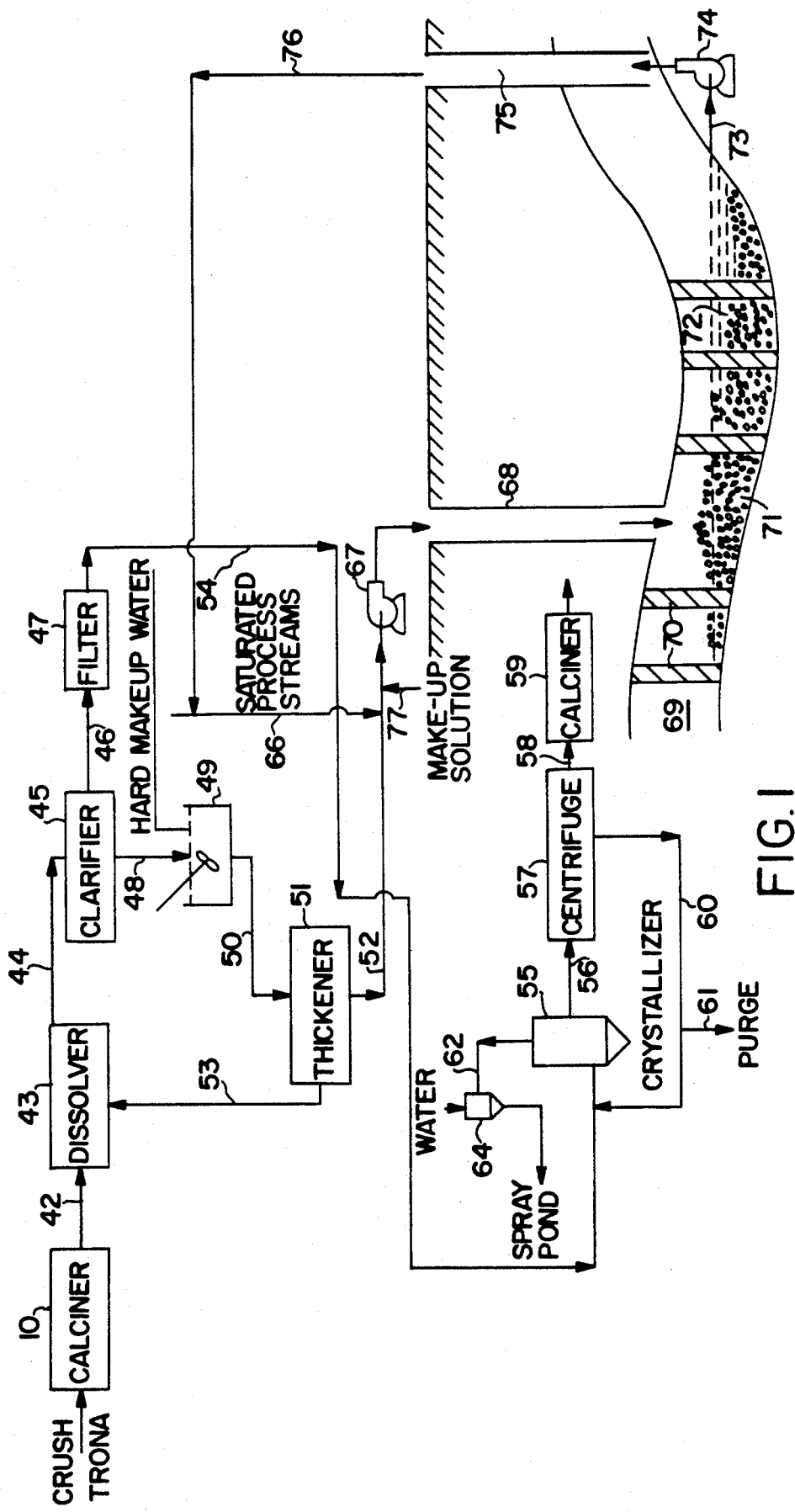

United States Patent [19]

Frint et al.

[11] Patent Number: 5,192,164
[45] Date of Patent: Mar. 9, 1993

[54] SODA ASH PRODUCTION

[75] Inventors: William R. Frint; Michael M. Bithell; William G. Fischer, all of Green River, Wyo.

[73] Assignee: FMC Corporation, Philadelphia, Pa.

[21] Appl. No.: 735,586

[22] Filed: Jul. 25, 1991

Related U.S. Application Data

[63] Continuation-in-part of Ser. No. 574,837, Aug. 29, 1990, Pat. No. 5,043,149.

[51] Int. Cl.⁵ .................. B09B 3/00; E02D 15/00
[52] U.S. Cl. .................. 405/128; 405/264; 405/267; 299/11
[58] Field of Search .......... 405/128, 263, 264, 266, 405/267; 299/11

[56] References Cited

U.S. PATENT DOCUMENTS

| | | | |
|---|---|---|---|
| 4,611,951 | 9/1986 | Sapp | 405/128 |
| 4,696,699 | 9/1987 | Harriett | 405/267 X |
| 4,746,249 | 5/1988 | Haigh et al. | 405/264 |
| 4,786,211 | 11/1988 | Leutner et al. | 405/264 |

Primary Examiner—David H. Corbin
Attorney, Agent, or Firm—Frank Ianno; Robert L. Andersen

[57] ABSTRACT

Process for disposal of insoluble tailings that remain when solubilizing uncalcined or calcined trona in the process of producing soda ash, in which tailings are slurried with a saturated or substantially saturated solution of sodium carbonate, sodium bicarbonate and mixtures thereof, pumping said slurry into a well connected to an underground mined-out cavity with sufficient pressure to prevent the build-up of tailings from plugging the bottom of the well opening, dispersing and settling said tailings and a retained portion of the solution in the cavity, removing solution from said cavity and conveying it to the surface, recovering the removed solution for recycle and slurrying of additional tailings, and adding as make-up liquor to replace the solution retained in the cavity, a saturated or substantially saturated solution of sodium carbonate, sodium bicarbonate and mixtures thereof. The preferred solution employed in this process is purge solution which is discarded from a crystallizer circuit.

6 Claims, 1 Drawing Sheet

SODA ASH PRODUCTION

This application is a continuation-in-part of U.S. patent application Ser. No. 574,837, filed on Aug. 29, 1990, now U.S. Pat. No. 4,043,149, in the names William R. Frint, Michael M. Bithell and William G. Fischer.

This invention relates to an improved process for recovering sodium chemicals, including sodium carbonate and/or sodium bicarbonate values from underground ore formations, especially trona, useful in manufacturing soda ash, sodium bicarbonate, caustic soda and other sodium chemicals and for disposing of tailings resulting from such ore processing, in an environmentally acceptable manner.

In southwestern Wyoming, in the vicinity of Green River, a vast deposit of crude, mineral trona ($Na_2CO_3 \cdot NaHCO_3 \cdot 2H_2O$) which lies some 243.8 m to 914.4 m (800 to 3000 feet) beneath the surface of the earth has been discovered. Other such underground deposits of trona have also been discovered in Turkey and China. The main trona bed at Green River is present as a seam about 3.66 m (12 feet) in thickness at approximately the 305 m (1,500 foot) level analyzing about 90% trona. The Green River trona beds cover 2,590 $km^2$ (1000 square miles) and consist of several different beds which generally overlap each other and are separated by layers of shale. In some areas, the trona beds occur over a 122 m (400 foot) stratum with ten or more layers comprising 25% of the total stratum. The quality of the trona varies greatly, of course, depending on its location in the stratum.

A typical analysis of this crude trona being mined at Green River, Wyoming, is as follows:

| Typical Crude Trona Analysis | |
|---|---|
| Constituent | Percent |
| Sodium Sesquicarbonate | 90.00 |
| NaCl | 0.1 |
| $Na_2SO_4$ | 0.02 |
| Organic Matter | 0.3 |
| Insolubles | 9.58 |
| | 100.00 |

As seen in the above analysis, the main constituent of crude trona is sodium sesquicarbonate. The amount of impurities, primarily shale and other nonsoluble materials, is sufficiently large that this crude trona cannot be directly converted into products which can be utilized in many commercial processes. Therefore, the crude trona is normally purified to remove or reduce the impurities before its valuable sodium content can be sold commercially as: soda ash ($Na_2CO_3$), sodium bicarbonate ($NaHCO_3$), caustic soda (NaOH), sodium sesquicarbonate ($Na_2CO_3 \cdot NaHCO_3 \cdot 2H_2O$), a sodium phosphate ($Na_5P_3O_{10}$) or other sodium-containing chemicals.

One major use for the crude trona is to convert and refine it into soda ash. In order to convert the sodium sesquicarbonate content of the trona to soda ash in commercially feasible operations, two distinct types of processes are employed. These are the "Sesquicarbonate Process" and the "Monohydrate Process".

The "Sesquicarbonate Process" for purifying crude trona and producing a purified soda ash is by a series of steps involving: dissolving the crude mined trona in a cycling, hot mother liquor containing excess normal carbonate over bicarbonate in order to dissolve the trona congruently, clarifying the insoluble muds from the solution, filtering the solution, passing the filtrate to a series of vacuum crystallizers where water is evaporated and the solution is cooled causing sodium sesquicarbonate to crystallize out as the stable crystal phase, recycling the mother liquor to dissolve more crude trona and calcining the sesquicarbonate crystals at a temperature sufficient to convert same to soda ash.

A more direct and simplified method which was subsequently developed is the "Monohydrate Process" which yields a dense, organic-free soda ash by a series of steps involving: calcining the crude trona at a temperature of 400° C. to 800° C. to convert it to crude sodium carbonate and removing the organics by oxidation and distillation, dissolving the crude sodium carbonate in water, clarifying the resulting sodium carbonate solution to remove insolubles as muds therefrom, filtering the solution, evaporating water from the clarified and filtered sodium carbonate solution in an evaporator circuit, crystallizing from the pregnant mother liquor sodium carbonate monohydrate, calcining the monohydrate crystals to produce dense, organic-free soda ash and recycling the mother liquor from the crystals to the evaporating step.

The calcination of the crude trona in the above process has a threefold effect. First, by calcining between a temperature of about 400° C. to 800° C., the organic matter present in the crude trona is removed. Secondly, the calcination effects a conversion of the bicarbonate present in the crude trona to sodium carbonate. Lastly, the crude sodium carbonate resulting from the carbonation has a greater rate of solubility then the crude trona. A comparison of the solubility rates set forth in Table I.

TABLE I

| | Percent $Na_2CO_3$ in Solution | |
|---|---|---|
| Time, Minutes | Crude Trona | Crude Sodium Carbonate |
| 1 | 13 | 31.5 |
| 2 | 17 | 32.5 |
| 3 | 18.5 | 32.5 |
| 5 | 19 | 32.0 |

The increase in the rate of solubility results in a great saving in the time required for completing a cycle in the process and results in increased production of soda ash.

In both the "Sesquicarbonate Process" and "Monohydrate Process" substantial amounts of insolubles which do not dissolve in the dissolving solutions must be separated from the dissolved raw trona or dissolved calcined trona, respectively, in these processes. The separation normally takes place in a clarifier where the insolubles settle to the bottom as muds leaving a clarified solution of raw or calcined trona which can be sent downstream to a crystallizer circuit for recovery of a crystallized product. These muds are preferably contacted with raw make-up water, required for the dissolver circuit, to soften the make-up water before being used to dissolve the trona ore as described in U.S. Pat. No. 3,131,996 issued to Leonard Seglin, et al. After such clarification and make-up water softening step, described above, the muds and softened water are usually passed to a thickener where the muds are concentrated and thickened. A softened water solution recovered from the thickener is returned to the dissolver circuit and the thickened muds, often called tailings, are sent to surface disposal impoundments where they are contained.

Although the insolubles amount to only a small fraction, typically about 10% of the mined trona, it becomes a sizeable quantity of total disposable tailings on the order of 317,500 metric tons/year (350,000 tons/year) when operating a plant producing 1,814,285 metric tons/year (two million short tons) of soda ash per year. Such tailings must, of course, be disposed of in an environmentally acceptable manner.

One obvious method of tailings disposal would be to place the tailings back in the environment from whence they originated. Since the tailings only comprise about 10% of the volume of material removed in the mining process, there exists ample space in the mine to permanently store the tailings. However, many problems exist in separating tailings from most or all of the associated water solution in contact with the insolubles, transporting the tailings back down the mine shafts, conveying them underground to the mined-out areas and placing them in abandoned areas of the mine which may no longer have roof bolts and in which subsidence of the area has commenced. Such abandoned areas can only be entered at great hazard because of roof falls and methane gas build-up.

Further, if the tailings are not almost dry, the moisture or solution will drain off from the tailings and spread throughout the mine, creating a messy and hazardous situation unless the liquid is confined and/or collected and returned to the surface. Again, entering an abandoned mine area to collect or confine such liquid is usually too hazardous for normal practice.

Disposal of tailings in the active mine area is another option. However, the problem of trying to transport tailings back into the mine while removing ore from the mined areas simultaneously would create serious organizational problems and production interference.

Such problems associated with attempts at conventional underground disposal of trona tailings make such procedures economically unsound and difficult to implement.

It has now been found that such tailings can be disposed of underground by slurrying the tailings with sufficient amounts of a saturated or substantially saturated aqueous solution of sodium carbonate, sodium bicarbonate or mixtures thereof to permit the slurry to be pumped, pumping the slurry into a well connected to an underground mined-out cavity in a trona bed with sufficient pressure to prevent build-up of tailings from plugging the bottom of the well opening, continuing to pump said tailings slurry into said cavity, dispersing and settling said tailings along with a retained portion of said aqueous solution in said cavity, removing aqueous solution from said cavity and conveying it to the surface, recovering said removed aqueous solution from said cavity for recycle and for slurrying additional tailings, and adding as make-up liquor to replace the retained portion of solution in said cavity a saturated or substantially saturated aqueous solution of a salt selected from the group of sodium carbonate, sodium bicarbonate and mixtures thereof. The preferred liquor employed for slurrying the tailings and as make-up liquor is purge solution which is discarded from a crystallizer circuit.

In this process, the sodium carbonate and/or sodium bicarbonate concentration (also termed "total alkali" or "TA", expressed as $Na_2CO_3$) of the liquor does not increase by any material trona dissolution.

This process unexpectedly achieved two desired results. Initially, it permitted tailings to be conveyed and introduced into an otherwise inaccessible underground cavity through a cased injection well without clogging its lower opening into the underground cavity. Apparently, by introducing such tailings with an aqueous solution in slurry form and under a high static head, the tailings slurry can be dispersed over a wide area underground without forming a cone-shaped build-up of tailings below the well opening that chokes off the opening of the injection well leading into the cavity.

The second benefit is that when purge liquor which is discarded from the crystallizer circuit is employed as all or part of the slurrying liquor, some of the liquor remains as an integral part of the tailings which settle out underground. Thus, the purge can be disposed of underground along with the tailings by binding up of retained purge liquor with the tailings solids. Purge liquor is a saturated, or substantially saturated solution of sodium carbonate and/or sodium bicarbonate which is discarded from the crystallizer circuit in order to maintain certain purity levels in the crystallizer circuit, especially of chlorides, sulfates, etc. Normally, the purge cannot be reused in the process and it is stored with other wastes in surface disposal impoundments. In the instant process, the purge stream is used preferably for start-up of the recirculated liquor employed to slurry the tailings and as make-up to replace that portion of the liquor retained by the tailings underground. Since the purge stream is relatively small, about 220,000 tons of solution purge in a two million short ton soda ash plant, it often can be balanced with the amount that is retained with the tailings underground so that ultimately the entire purge stream can be disposed of underground with the tailings.

The use of a saturated or near saturated solution to slurry the tailings is important to prevent expanding the underground mined-out area where disposal is being carried out. This prevents any expansion of the tailings and purge storage area by dissolving any of the remaining trona formation and entering into adjacent areas of the mine wherein active dry mining is still being carried out. The use of such saturated or substantially saturated slurrying liquor is necessary if the underground tailings storage area is to be contained without any expansion into other areas of the mine. As used in the specification and claims, the term "substantially saturated" means that the liquor contains sufficient sodium carbonate, sodium bicarbonate or both, at the temperature of the trona formation, that there is no material attack or dissolution of the trona formation in the mine.

In carrying out the instant process, a closed injection well is drilled to the underground mined-out area. This is accomplished by drilling and installing a small diameter well (for example, 12.7 cm (5 inches) from the surface down into the mined-out area. Precautions should be taken to drill into the mined cavity or void rather than a pillar. The instant process is capable of working in mined-out areas where the pillars, roof and ceiling are intact or in areas where there has been partial collapse of the roof, pillars, and/or with floor heave or where some subsidence has occurred.

The mined-out area normally contains trona pillars and residual, unmined trona. The trona pillars are left to support the ceiling during the original mining. After mining, the trona pillars remain and slowly deform allowing gradual subsidence of the ceiling to control ground conditions as mining retreats. In addition to trona pillars and rubble after subsidence occurs, the mined-out area contains trona layers remaining in the ceiling and floor which are too close to shale beds surrounding the trona seam to mine economically.

The solution used to slurry up the tailings is normally obtained from waste process streams throughout the soda ash plant on the surface. If the concentration of the solution sodium carbonate, sodium bicarbonate or mixtures thereof is less than saturated, it must first be concentrated. A stream containing at least about 17% TA is acceptable. A preferred waste stream is the purge stream discarded from the crystallizer circuit since this is a saturated stream. Since purge cannot be recycled to the surface plant without increasing the plant's impurities level, it is ideal for use as a slurrying and make-up solution. Also, the purge stream can be used solely as make-up solution replacing that which remains bound up with the solid tailings and which does not readily separate from them. Ultimately, the residual solution that is retained with the tailings often balances the amount of the purge stream from the plant used as make-up and can result in all of the purge being disposed of and bound up with the tailings underground.

The solution is mixed with tailings in amounts sufficient to have a pumpable mixture. A slurry containing about 15% by weight of tailing solids has been found most suitable. More dilute slurries can be used, of course, but that increases the amount of solution required to be employed to handle the tailings. A more concentrated slurry makes handling and pumping of the slurry more difficult.

The slurry containing about 15% by weight solids, is then pumped down the cased injection well with a sufficient static head that the slurry disperses the tailings throughout the mined-out area. The deeper the well, the greater the natural static head it will have. The pumping pressure required will decrease with deeper wells, because the natural static head will supply most or all of the pressure required for proper tailings dispersal.

Upon being injected, the tailings settle to the bottom of the mined-out underground area where they originated and a major portion of the solution used to slurry the tailings slowly migrates to the lowest level contacting trona as it goes. Such contact does not dissolve additional trona because the solution is saturated or substantially saturated so that no material attack of the trona formation takes place.

By introducing the tailings in slurry form and under sufficient static and/or velocity head, the tailings are dispersed over a much larger area than would be possible if the natural slope of the tailings formed a cone whose tip terminated at the discharge opening of the well casing and which would choke such well opening. In the instant process, the solid tailings underground in time form a truncated cone which can extend in a normal 2.44 m (8 foot) high mining zone as far as about 304 m (1500 feet) at its base, if the base is on a horizontal surface, The shape of the cone ranges from 2 to 3 degrees from horizontal at the discharge point where coarser particles settle, to 0.5 to 1 degree from horizontal where smaller, less dense particles and slimes settle out. If the floor is not horizontal, or the trona bed is sloped, the deposition area will be elongated down slope. If the slope of the trona bed exceeds 3 degrees, almost all of the slurry will run down hill to a more level area. In the event the mined-out area forms a basin, it is possible to completely fill the basin with tailings even if the injection well is not located in the center of the basin.

The trona tailings will bind and retain, as residual moisture, about 30% of the solution used to slurry them and inject them underground. Since this often balances the amount of the purge solution used as make-up, it permits the purge to be disposed of as retained solution with the tailings. The excess will drain to the lowest available point underground that it can reach. Normally, this can be determined in advance based on topographical maps of the mined area. The solution is allowed to drain until it reaches an accessible area of the mine where it can be collected in a sump. Alternately, it can be diverted via ditches or embankments to a central area where it is collected.

The solution is then removed from the area, essentially free of insolubles, via a sump, and finally pumped to the surface and recycled for use in slurrying and injecting additional tailings. Additional make-up solution is added to replace that retained by the tailings injected underground, preferably by using the purge as the make-up.

Referring now to the drawing, FIG. 1 illustrates diagrammatically an embodiment of the instant process in conjunction with the "Monohydrate Process" for the production of soda ash.

In this embodiment, a crude trona is calcined in calciner 10 to crude sodium carbonate which is conveyed by line 42 into the dissolver 43 wherein the sodium carbonate is dissolved in make-up water from line 53. The resulting crude sodium carbonate solution carrying the insoluble muds is passed from the dissolver 43 by line 44 to clarifier 45 wherein the insoluble muds are settled out and the clarified overflow passes through line 46 to filter 47.

The muds are removed from clarifier 45 by line 48 to a head tank 49 where they are thoroughly mixed with hard make-up water natural to the region and/or other plant solutions. The resulting mixture is passed by line 50 to the thickener 51. The softened water and the thickened muds, termed "tailings", are removed from the thickener 51 through line 52 for disposal. The softened water and dissolved TA values overflow from the thickener 51 flows through line 53 and is added to the dissolver 43 to provide softened water for dissolving the crude calcined trona.

The filtered sodium carbonate solution is passed through line 54 from the filter 47 to the crystallizers 55 wherein water is removed by evaporation, and a slurry of sodium carbonate monohydrate crystals is formed in the mother liquor. The vapors from the crystallizers may be discharged to the atmosphere or may be led by line 62 through condenser 64 to a spray pond, for example, from which the cool water is returned to the condenser. The crystal slurry is passed from the crystallizers 55 through line 56 to a centrifuge 57 wherein the mother liquor is separated from the sodium carbonate monohydrate crystals by settling and by centrifugation. The sodium carbonate monohydrate crystals are passed through line 58 to the calciner 59 where the sodium carbonate monohydrate crystals are calcined to soda ash. The mother liquor from the centrifuge 57 is recycled via line 60 to the crystallizer 55 after purging enough mother liquor via line 61 to prevent the build-up of impurities, such as chlorides and sulfates.

The tailings in line 52 are mixed with saturated or substantially saturated waste process streams which are introduced through line 66. Purge liquor from line 61 may be employed for this purpose. The resulting slurry, having about a 15% by weight solids content, is pumped via pump 67 down a cased injection well 68 into a mined-out, underground area 69, containing residual pillars of trona 70. The tailings 71 disperse throughout the basin 69 and settle to the bottom. The solution used to slurry the tailings 72 separates and overflows the area 69. During its stay in the area 69, the solution 72 contacts but does not dissolve the trona in the area and does not increase its TA value. The solution is then collected and passed via line 73 to pump 74 where it is pumped to an exit well 75 and is recycled via line 76 to slurry additional tailings with solution from line 66. Make-up solution is supplied via line 77 to line 52, preferably by purge 61 from the crystallizer circuit 60.

An example for carrying out the present invention is set forth below.

EXAMPLE A

Tailings Injection Without Enrichment Of Removed Liquor

Insoluble tailings from a thickener employed in the "Monohydrate Process" are partially dewatered in a centrifuge to yield a 48% solids stream and an aqueous stream which is recycled to the dissolver circuit for recovery of TA values. The solids stream is mixed with sufficient evaporator purge liquor from the crystallizer circuit and with all of the solution recovered from prior tailings injection, which solution contains from 17.5% to 20.5% by weight total alkali (sodium carbonate and sodium bicarbonate weight percent expressed as equivalent sodium carbonate) to produce a slurry containing 15% by weight tailings and at least 17.5% by weight total alkali in the aqueous portion of the slurry. The slurry was pumped at a 470 gallon/minute rate into a cased injection well 1500 feet deep into an underground mined-out area of the trona deposit where there is little intrusion of ground water. The natural head is sufficient to disperse the tailings without plugging the well opening underground. The insoluble tailings in the slurry settle out and reduce the injection volume by approximately 50 gallons/minute tailings solids and 110 gallons/minute of solution retained by the solid tailings. At a concentration of at least 17.5 weight percent TA, the liquid portion of the tailings slurry injected into the mined-out area is substantially saturated in TA at the 22° C.–25° C. temperature in the mine. The liquor recovered from the area overflow and pumped to the surface also was found to be substantially saturated in total alkali at from 17.5 to 20.5 weight percent TA. Thus, no TA enrichment of the liquid portion of the injected slurry occurred (unlike Example B where the total alkali increased from 10% to 17.5% TA). All of the liquor recovered from the area overflow was recycled back to the tailings slurry preparation step along with make-up purge to replace that retained underground with the tailings.

EXAMPLE B

Tailings Injection With Unsaturated Liquor And Enrichment Of The Removed Liquor

Insoluble tailings obtained from a thickener employed in the "Sesquicarbonate Process" were mixed with sufficient process water and plant waste solutions to yield a solution having a 10% TA by weight total alkali content, that is, a dissolved sodium carbonate and/or sodium bicarbonate content of 10% by weight, until a slurry of 15% by weight tailings was formed. 37.85 liter/second (six hundred gallons per minute [600 gpm]) of the tailings slurry was injected by pump into a cased injection well 305 m (1,500 feet) deep that fed into an underground mined-out area located in a trona seam and supported by trona pillars. The natural head was sufficient to disperse the tailings in the area without plugging the well opening underground. This injection of tailings slurry continued at the above rate for several months. Previously, some water was entering the mined-out area from aquifers below the trona bed and was removed at a rate of 11.04 liters/second (175 gallons per minute). The underground tailings disposal system added an additional 25.24 liters/second (400 gallons per minute) to this flow, the injection volume was reduced about 12.61 liters/second (200 gpm) [(about 3.8 liters/second 60 gpm tailings solids and about 8.8 liters/second 140 gpm of liquid)] by settling out of the solids and the retained moisture. The liquor recovered from the area overflow had a total average TA of 17.5% since start-up of the tailings disposal project. The liquor is pumped from the underground area to the surface and then placed in an evaporation pond where it is concentrated. Sodium carbonate decahydrate crystals are recovered and used as an auxiliary feed to an existing soda ash plant to recover the TA values and convert them to soda ash. Currently, the system has been in operation for more than 9 months without problems, with the tailings distributed back underground where they originated. Dissolution of the underground trona by the solution has continued to occur at a constant rate to yield an overflow liquor averaging about 17.5% total alkali.

We claim:

1. Process for disposal of insoluble tailings underground, said tailings being derived from insolubles that remain when solubilizing uncalcined or calcined trona in the process of producing soda ash, comprising slurrying the tailings with a saturated or substantially saturated aqueous solution of a salt selected from sodium carbonate, sodium bicarbonate and mixtures thereof, pumping said slurry into a well connected to an underground mined-out cavity in a trona bed with sufficient pressure to prevent build-up of tailings from plugging the bottom of the well opening, continuing to pump said tailings slurry into said cavity, dispersing and settling said tailings along with a retained portion of said aqueous solution in said cavity, removing aqueous solution from said cavity and conveying it to the surface, recovering the removed aqueous solution from said cavity for recycle and slurrying additional tailings, and adding as make-up liquor to replace the retained portion of solution in said cavity a saturated or substantially saturated aqueous solution of a salt selected from the group of sodium carbonate, sodium bicarbonate and mixtures thereof.

2. Process of claim 1 wherein the said aqueous solution used in slurrying the tailings is purge liquor.

3. Process of claim 1 wherein said make-up liquor is purge liquor.

4. Process of claim 1 wherein the slurry of tailings contains about 15% by weight of solids.

5. Process of claim 1 wherein the said aqueous solution used to slurry said tailings contains at least about 17% of sodium carbonate, sodium bicarbonate or mixtures thereof.

6. Process of claim 1 wherein said aqueous solution removed from said cavity is saturated or essentially saturated with said salt.

* * * * *